United States Patent [19]

Leon et al.

[11] 4,019,752
[45] Apr. 26, 1977

[54] WHEELCHAIR RESTRAINT DEVICE

[75] Inventors: Denny Leon, Mountain View; Frederick M. Stewart, Los Gatos, both of Calif.

[73] Assignee: FMC Corporation, San Jose, Calif.

[22] Filed: Sept. 10, 1975

[21] Appl. No.: 612,436

[52] U.S. Cl. .......................... 280/179 R; 188/2 F; 188/4 R; 188/74; 248/509

[51] Int. Cl.² .......................................... B60P 7/00

[58] Field of Search ............ 188/2 F, 4 R, 4 B, 29, 188/32, 74, 35, 36; 280/179 R; 105/464, 368 B; 248/500, 503, 507, 508, 509

[56] References Cited

UNITED STATES PATENTS

| | | | |
|---|---|---|---|
| 1,776,935 | 9/1930 | Snyder | 188/32 X |
| 2,079,992 | 5/1937 | Gonzalez | 188/32 |
| 2,134,823 | 11/1938 | Herrmann et al. | 248/509 |
| 3,189,127 | 6/1965 | Karnow et al. | 188/32 |
| 3,752,265 | 8/1973 | Lyder | 188/2 F |

*Primary Examiner*—George E. A. Halvosa

*Attorney, Agent, or Firm*—R. S. Kelly; L. B. Guernsey; C. E. Tripp

[57] ABSTRACT

A restraint device which can be quickly and easily installed in a vehicle to restrain wheelchairs from moving in any direction. A base of the device bolts to the floor of a vehicle used to transport the physically handicapped. A pair of vertically inclined rods connected to the base are positioned on either side of a space for a wheelchair. A clamping member slidably mounted on each of the inclined rods rests against the top of a large wheel of the wheelchair to clamp the wheel between the clamping member and a horizontal rod connected to the base of the restraint device. The clamping members can be easily locked in position and unlocked by a patient in the wheelchair using very little pressure and requiring very little dexterity. The device prevents forward, backward, upward and sideways movement of a wheelchair which has thus been locked in position.

15 Claims, 8 Drawing Figures

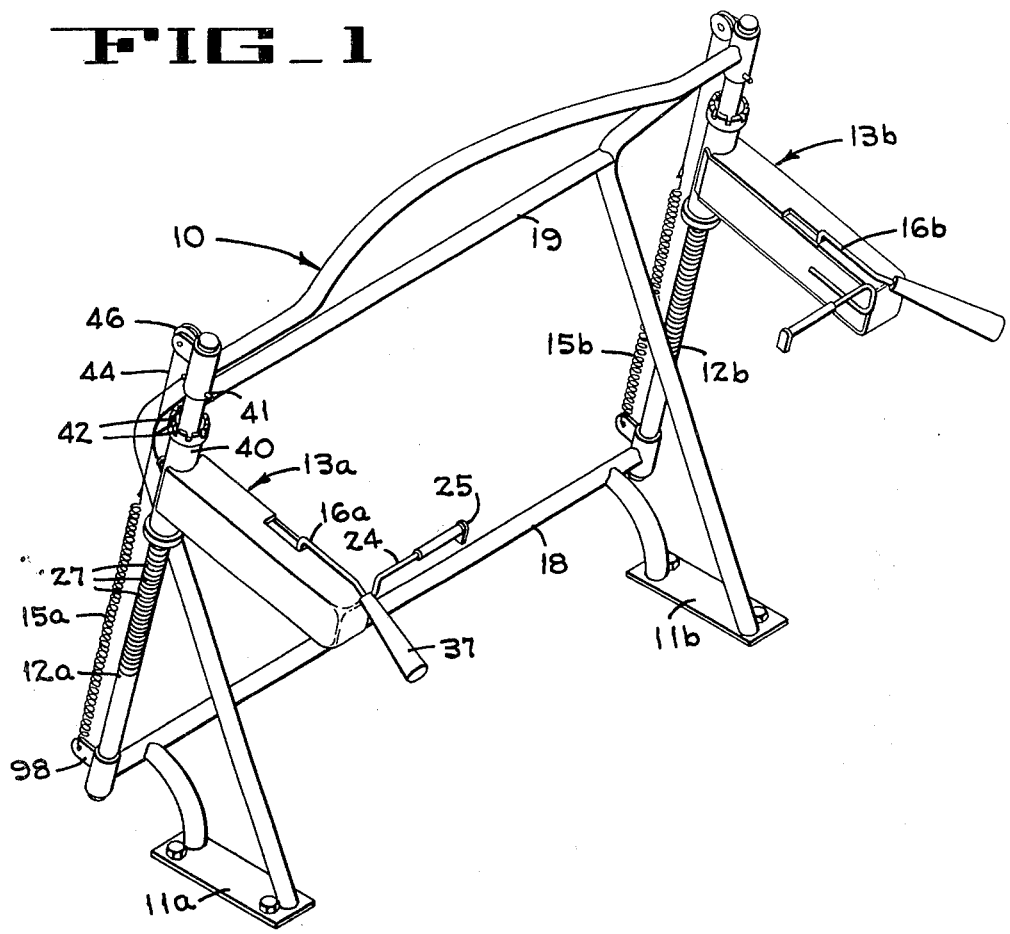
FIG_1
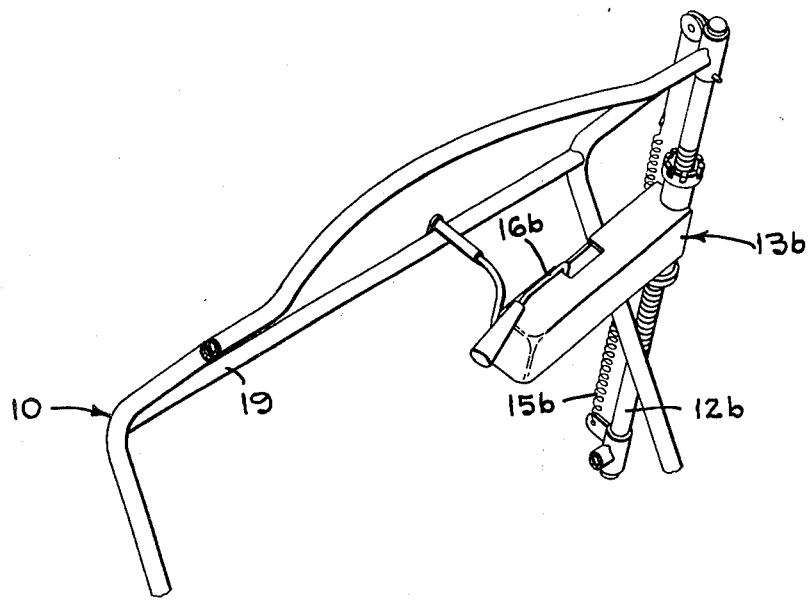
FIG_2

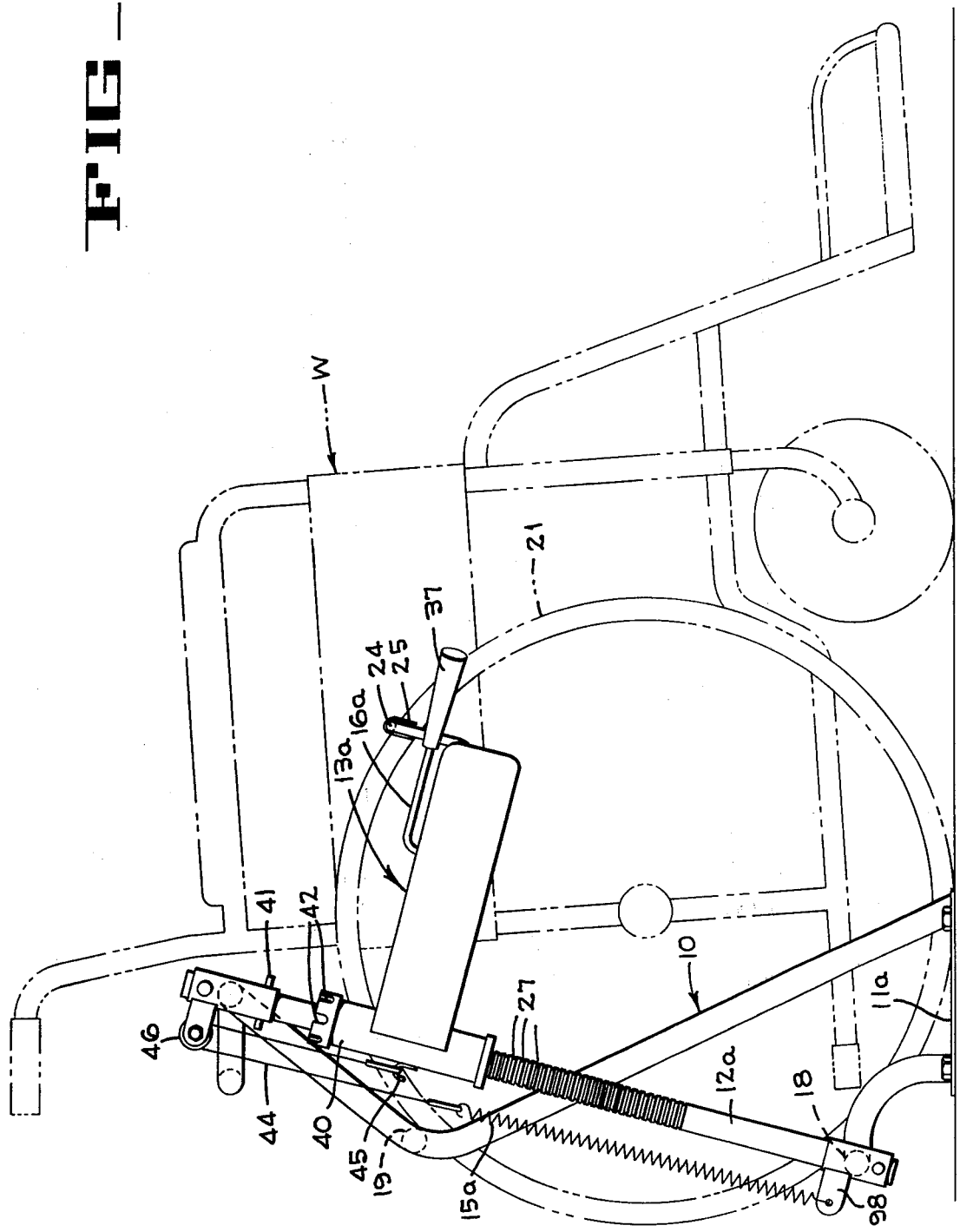

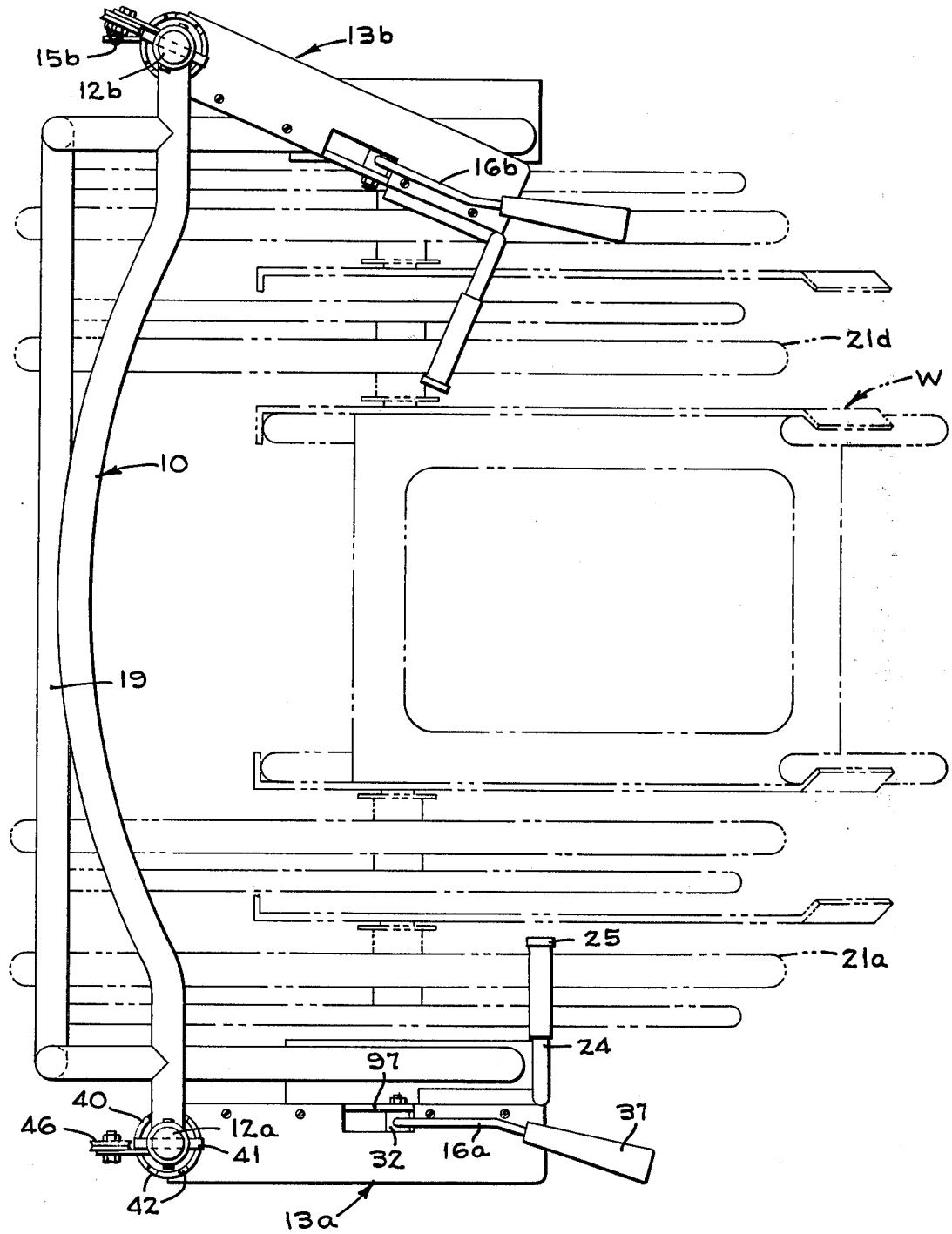
FIG_4

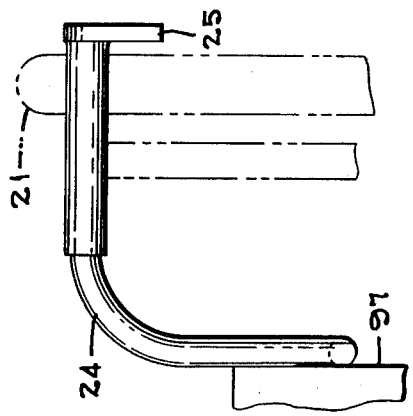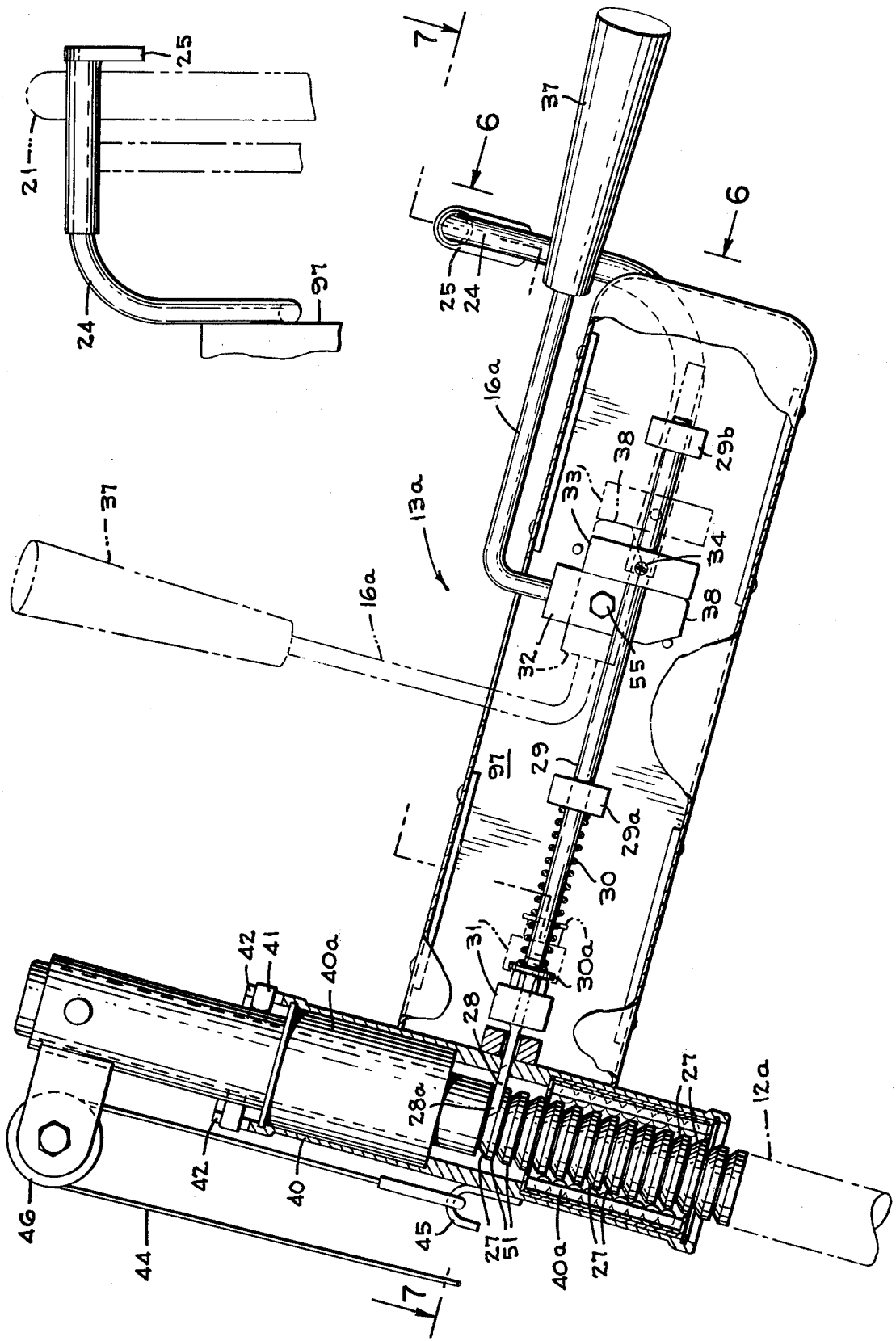

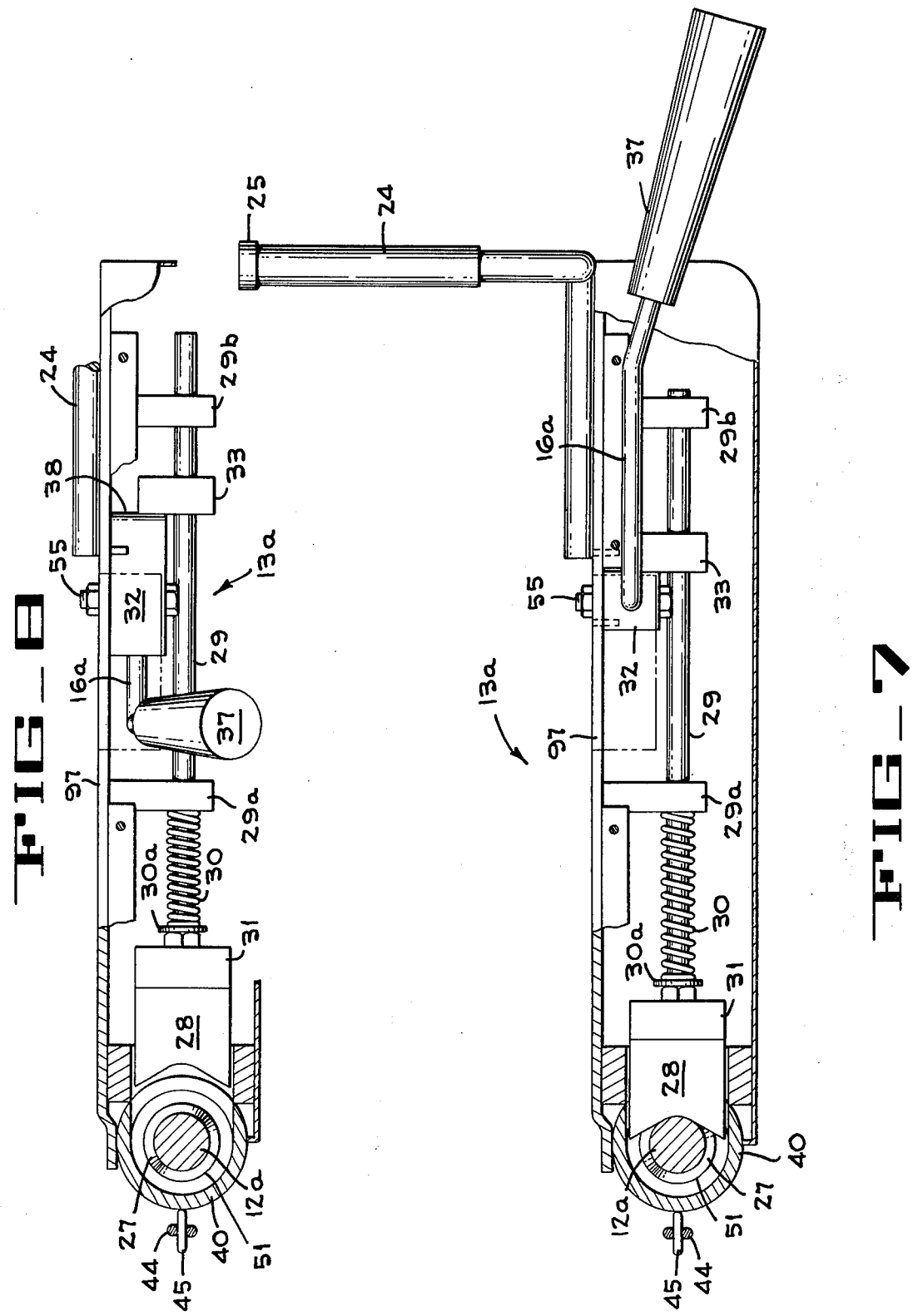

WHEELCHAIR RESTRAINT DEVICE

BACKGROUND OF THE INVENTION

1. FIELD OF THE INVENTION

The present invention pertains to wheelchair restraint devices, and more particularly, it pertains to wheelchair restraint devices which can be quickly and easily installed in a vehicle to restrain a wheelchair from moving in any direction.

2. DESCRIPTION OF THE PRIOR ART

A typical wheelchair has two large wheels rotatably mounted with one on either side of the chair at positions where the patient can grasp the wheels to propel the chair. A pair of smaller support wheels are usually mounted between the large wheels and a footrest that extends outwardly at the front of the chair. Many of the prior art wheelchairs use a brake on each of the large wheels to prevent the chair from moving while it is in a vehicle being used to transport the patient. However, this often does not work satisfactorily because the wheels may slide across the floor while the vehicle is changing speeds or changing direction. If the vehicle slows down, at even a normal rate, for stop lights or for traffic and the wheelchair is facing the front of the vehicle, the chair may move rapidly along the floor of the vehicle. This is due to the fact that the slowing of the vehicle causes the chair to tilt in a forward direction so that the weight of the patient and chair is transferred almost entirely to the front wheels of the chair. As a result, any braking action between the floor of the vehicle and the rear wheels of the chair is not enough to overcome the inertia of the patient and chair. The chair may move wildly forward and bump into other chairs in the vehicle or into obstacles near the front of the vehicle.

Chairs with brakes on the rear wheels may also move, or even turn over, when the transporting vehicle turns a corner. As the vehicle turns, most of the weight of the patient and wheelchair is shifted to the wheels on one side of the chair. This allows the wheels without the weight to slide along the floor so that the chair may move and turn on the floor of the vehicle. If the vehicle turns a sharp corner the wheelchair may tilt far enough so that it turns over on its side. Thus, the prior art wheelchairs which rely solely upon the use of brakes on the large wheels are unsatisfactory because the wheelchair is not locked securely in position in the moving vehicle.

Other prior art restraint devices for wheelchairs make use of latches or belts which are fastened between the wheelchair and a portion of the vehicle being used to transport the wheelchair. This type of restraint device is generally unsatisfactory because the patient is often not able to hook and unhook the restraining devices himself but must be assisted by an attendant who connects and disconnects the restraint devices. This causes the loading and unloading of wheelchair patients to be slow and may also cause the patients to be trapped in the vehicle should the attendant not be readily available for releasing the patients at a discharge point.

A wheelchair locking arrangement which is designed to allow the patient himself to lock and unlock his wheelchair to the floor of a vehicle disclosed in a recently issued U.S. Pat. No. 3,752,265 to Lyder. However, the Lyder apparatus requires that specially designed hardware be attached to the sides of the wheelchairs before the chairs can be secured to the floor of the moving vehicle. Also the wheelchairs must be positioned in exactly the right location in the vehicle before the locking attachment can be connected between the wheelchair and the floor of the vehicle. The locking attachment shown in the Lyder patent also requires some physical dexterity in positioning the wheelchair and in connecting a pair of vertical shafts to threaded socket members mounted in the floor of the vehicle. For these reasons the Lyder device is not readily adapted for use in vehicles where a wide variety of patients may be transported or where the patients do not have the required dexterity to make the connection between the locking attachment and the mating socket member in the floor of the vehicle.

SUMMARY OF THE INVENTION

The improved wheelchair restraint device of the present invention overcomes the problems involved with the prior art restraint devices and it can be quickly and easily installed in a vehicle to restrain wheelchairs from moving in any direction therein. The device can be used to lock a variety of types of wheelchairs having a wide variety of wheel sizes into position in the vehicle. Very little dexterity and very little effort is required by the wheelchair patient in order to accomplish the locking operation entirely by himself. If the patient cannot lock the wheelchair into the restraint device himself, this can be quickly done by an attendant. The device clamps the wheels of the wheelchairs securely to the vehicle without the need for any special attachments on the chairs.

BRIEF DESCRIPTION OF THE DRAWINGS

FIG. 1 is a perspective view of the wheelchair restraint device of the present invention with the clamping members being shown in operating position.

FIG. 2 is a fragmentary perspective view of the wheelchair restraint device, showing one of the clamping members in a folded position.

FIG. 3 is a side elevation of the restraint device shown in an operative position with the wheelchair that is clamped by said device being shown in phantom lines.

FIG. 4 is a plan view of the restraint device showing the device in operative position and with the wheelchair being clamped by said device being shown in phantom lines.

FIG. 5 is an enlarged side elevation of one of the clamping members with portions thereof being broken away and with the control lever being shown in both its locking position (in full lines) and its releasing position (in phantom lines).

FIG. 6 is a fragmentary elevation taken in the direction of the arrows 6—6 of FIG. 5.

FIG. 7 is a horizontal sectional view taken along line 7—7 of FIG. 5 and showing the clamping member in a locked position.

FIG. 8 is a horizontal section, similar to FIG. 7, but showing the clamping member in an unlocked position.

DESCRIPTION OF THE PREFERRED EMBODIMENT

Referring more particularly to the drawings, FIG. 1 shows the wheelchair restraint device of the present invention which will be seen to comprise a pair of base members 11a and 11b, that are designed to be bolted to the floor of a vehicle, and a frame 10 connected to and supported by the base members. The frame includes a horizontally positioned bar 18 that supports at its ends a pair of vertically inclined support posts 12a and 12b each of which, in turn, slidably support a clamping member 13a, 13b that may be locked in a wide range of vertical positions on the support post. The clamping members are biased in an upward direction by a pair of springs 15a and 15b which are each connected between one of the clamping members and the frame of the restraint device. A pair of levers 16a and 16b provided on the upper faces of the clamping members are used to control the locking and releasing of the clamping members 13a and 13b, respectively, from the support posts.

Details of one of the clamping members 13a and its mounting on the vertically inclined support post 12a are shown in FIGS. 5, 7 and 8. Since the other clamping member 13b and its support post 12b are similar except for the reversed orientation of the clamping member, such structure will not be described in detail herein. As best shown in FIG. 5, a series of closely spaced annular grooves 27 are machined into the vertically inclined post 12a over the major portion thereof so that the clamping member 13a can be locked onto the post in a variety of vertical positions to accommodate a wide variety of sizes of wheelchair wheels. A shiftable blade 28 is carried by the clamping member and is designed to fit into the annular grooves 27 to lock the clamping member into position against the wheels of the wheelchair. The blade 28 is attached to a rod 29 which is slidably mounted within the body of the clamping member to move the blade 28 into and out of engagement with the support post 12a. As seen in FIGS. 5, 7 and 8, rod 29 is slidably mounted within a pair of mounting brackets 29a and 29b which are fixed to a flat sidewall 97 of the clamping member. The rod 29 is threaded into an enlarged portion 31 at the inner end of the blade 28, and a coil spring 30 is mounted between bracket 29a and a washer 30a at the outer end of the rod and surrounds the rod so as to cause the blade 28 to normally be secured within one of the annular grooves 27 on the support post. The blade is released from contact with the support posts by upward rotational movement of the lever 16a, the inner end of which is secured to a cam 32 which is constrained to pivot about a shoulder screw 55 mounted for rotation upon the side wall 97. As cam 32 pivots through a 90° rotational movement it forces a cam follower block 33, that is adjustably secured to the rod 29 by a set screw (FIG. 5), to move from the full line to the phantom line position shown in FIG. 5. Thus, the movement of the cam follower block causes the rod 29 and the attached blade 28 to move to the right (as seen in FIG. 5) so that the blade is pulled away from its locked position within one of the annular grooves on the supporting post 12a. When the handle 37 at the end of the lever 16a is raised to a vertical position the surface 38 (FIG. 5) of the cam 32 rests against the flat inner surface of the cam follower block 33 thereby locking the blade 28 out of contact with the support post 12a so the clamping member 13a will be free to move upwardly and downwardly along the length of the support post.

Clamping member 13a is biased in an upward direction by the spring 15a (FIG. 3) which is connected between a bracket 98 secured to the lower portion of the frame 10 and one end of a cable 44. The cable is positioned over a pully 46 at the top of support post 12a (FIG. 5) and connected to a hook 45 which is secured to a mounting collar 40 of the clamping member 13a that slidably secures the clamping member to the support post. The collar 40 is secured to the support post 12a by means of a pair of spaced bearings 40a (FIG. 5) which permit free travel of the clamping member upwardly and downwardly on the support post. When the lever 16a of the clamping member is lifted into its upper position (as shown in phantom lines in FIG. 5) the blade 28 is retracted out of contact with the grooves 27 in the support post, as previously explained, so that the spring 15a can pull the clamping member upwardly on the support post. The bearings 40a of the supporting collar 40 also permit the clamping member to be rotated about the axis of the support post in order to permit a wheelchair to be moved into and out of the parked position within the wheelchair restraint device.

It will be noted that the supporting collar 40 is provided with a plurality of open-ended slots 42 circumferentially spaced about the upper annular end of the collar. A fixed pin 41 extends through the upper end of the support post 12a, and it will be appreciated that when the lever arm 16a is pivoted upwardly and the clamping member is allowed to ride upwardly on the supporting post the pin 41 will become engaged within a pair of oppositely positioned slots 42 to prevent both further upward movement of the clamping member and rotational movement of the clamping member on the support post.

The grooves 27 on the support post 12a are formed by a tapered surface on one side only, as shown in FIG. 5, and the projecting end 28a of the blade 28 is provided with a similarly tapered surface so that the entire clamping member 13a may be moved downwardly on the support post 12a without lifting the lever 16a and retracting the blade in the manner previously pointed out. Only a small force is needed to overcome the bias of the spring 15a in order to thus move the clamping member 13a downwardly on the support post. As the clamping member moves in a downward direction, the blade 28 slides along the tapered side of a groove 27 until it reaches a projecting annular ring portion 51 (FIG. 5). As the blade continues downwardly the end 28a of the blade moves over the ring portion and into the next lower annular groove 27. It is desired that a force of approximately 2 pounds be required to move the clamping member 13a downwardly against the force of the resisting tension spring 15a.

Clamping member 13a also includes a laterally extending wheel restraining member 24 (FIG. 6) which is secured to the outer face of the sidewall 97 and which is designed to rest against the upper portion of the wheel of the wheelchair to prevent its forward movement away from the restraint device. The clamping member 24 includes a laterally projecting flange 25 at its outermost edge which flange is designed to rest against the side of the wheelchair wheel to prevent lateral movement thereof.

As pointed out previously, the support post 12b and its clamping member 13b are of similar construction to the post 12a and clamping member 13a, respectively, except that the orientation of the clamping member is reversed on the support post as clearly seen in FIG. 1 of the drawings; thus, the structure of post 12b and clamping member 13b will not be described in detail herein and it will be understood that such structures are provided with elements similar to those previously described with respect to support post 12a and clamping member 13a.

When it is desired to move the clamping members 13a and 13b outwardly so that a wheelchair may be moved into position therebetween, the clamping members are rotated about the axes of the support posts 12a and 12b, respectively, and a pair of oppositely located slots 42 on each collar 40 are locked onto the respective pins 41 so as to hold the clamping members in an outwardly pivoted position.

The horizontally positioned bar 18 and a second bar 19 of the frame 10, which is horizontally positioned at the top of the frame structure, are used to secure the wheels of a wheelchair W (FIG. 3) to prevent them from moving in a backward direction. These frame bars also serve to lend rigidity to the frame of the restraint device. When the large rear wheels 21 of the wheelchair are significantly smaller than the wheels shown in FIG. 3, the chair may be backed into position with each of the rear wheels 21 positioned against only the horizontal bar 18. The clamping members 13a and 13b are then lowered until the inwardly projecting wheel restraining members 24 make contact with the upper portions of the wheels to clamp them securely against the horizontal frame bar 18. A wheel of the size shown in FIG. 3 will thereby be securely clamped against both the lower horizontal bar 18 and the upper horizontal bar 19. Any wheel larger than the wheel shown will make contact with only the upper horizontal bar 19 and will be clamped between this bar only and the corresponding clamping member 13a or 13b.

A top view of the wheelchair restraint device of FIG. 4 shows how different widths of wheelchairs can be secured within the restraint device. When a relatively wide chair is placed in the restraint device the clamping members will be rotated into the position shown by the clamping member 13a in FIG. 4 with the wheel restraining member 24 resting near the top of the wheelchair wheel 21a. When a narrower chair is placed in the restraining device of the present invention the clamping members may be pivoted inwardly into the position shown by clamping member 13b in FIG. 4 with the wheel restraining member 24 making contact near the top of the wheelchair wheel 21d.

In operating the wheelchair restraint device of the present invention, the clamping members 13a and 13b are first both moved to their uppermost positions by lifting handles 37 upwardly, and the clamping members are then swung outwardly (i.e., apart) to permit the wheelchair to be moved therebetween. The clamping members may be temporarily locked in this outwardly pivoted position by means of the pins 41 and slots 42 as previously explained. The wheelchair is then backed into the parking position so that it is positioned approximately as shown in FIGS. 3 and 4. The clamping members are then each pivoted inwardly into position above the rear wheels of the chair and pushed downward until the wheel restraining members 24 thereof rest against the upper portions of the respective wheels of the chair. Upon the release of pressure on the clamping members, the blades 28 will engage the flat upper surfaces of a set of grooves 27 in the support posts 12a and 12b to prevent upward travel of the clamping members. The chair is now locked in place between one or both of the horizontal frame bars 18 and 19, and the wheel restraining members 24 — as particularly shown in FIG. 3.

To release the wheelchair, the handles 37 are rotated upwardly so that the springs 15a, 15b move the clamping members 13a and 13b away from the wheels of the chair. The clamping members are then pivoted outwardly so that the wheelchair can be moved away from the parking position.

When the restraint device is unoccupied by a wheelchair, the clamping members 13a and 13b can be rotated inwardly and the wheel restraint devices 24 at the ends thereof can be hooked over the upper frame bar 19, as shown in FIG. 2. This will securely hold the clamping members in place and will also make it easier to move about the restraint device without being encumbered by the projecting clamping members.

From the foregoing description it will be seen that the wheelchair restraint device of the present invention allows wheelchairs having a variety of widths and a wide variety of wheel sizes to be quickly secured to the floor of a vehicle. It is not necessary to fasten any special equipment to the wheelchairs themselves in order to adapt them for the restraint device of the present invention. Patients can fasten and unfasten their chairs with a minimum of effort and with very limited dexterity, and the device will positively prevent forward, backward, upward, or sideways movement of a wheelchair once it has been secured.

Although the best mode contemplated for carrying out the present invention has been herein shown and described, it will be apparent that modification and variation may be made without departing from what is regarded to be the subject matter of the invention.

What is claimed is:

1. A restraint device for maintaining a wheelchair in a stationary position on a floor, for use with a wheelchair having at least two wheels rotatably mounted to the sides of said chair, said device comprising:
   a base member secured to said floor;
   a horizontal member spaced above the floor and secured to said base member whereby the wheels of said chair can be moved into position against said horizontal member;
   a pair of clamping members, said clamping members each including means for engaging a portion of one of said wheels spaced from said floor to retain said wheel between said horizontal member and a corresponding one of said clamping members;
   means mounting each of said clamping members for travel along a path toward and away from said floor and intersecting a respective one of said wheels; and
   means for releasably locking said clamping members to their respective mounting means to selectively lock said clamping members in their said paths in positions engaging said wheels to thereby clamp each of said wheels between said horizontal member and a corresponding one of said clamping members.

2. A restraint device as defined in claim 1 wherein said clamping members each include a side restraining member adapted to prevent lateral movement of said wheels.

3. A restraint device as defined in claim 1 including means for biasing said clamping members along their said paths upwardly away from said wheels so that said clamping members will automatically move away from said wheels when said clamping members are released by said locking means.

4. A restraint device as defined in claim 1 wherein said locking means comprises a pair of spring-loaded blades and wherein said means mounting said clamping members comprise a generally upright posts each provided with a plurality of circumferential grooves engageable by one of said blades.

5. A restraint device as defined in claim 4 including spring means for biasing each of said clamping members upwardly on said upright posts, and selectively actuatable means for retracting said blades out of locking engagement with the grooves in said posts to permit said clamping members to be elevated out of engagement with said wheel.

6. A wheelchair restraint device for maintaining a wheelchair in a stationary position on the floor of a vehicle, for use with a wheelchair having a pair of wheels rotatably mounted to either side of said chair, said device comprising:
- a base adapted to be fastened to said floor;
- a frame having a pair of vertically inclined posts, with one inclined post positioned on either side of a space for a wheelchair, said frame being connected to said base;
- a horizontal bar connected between said vertically inclined posts so that the wheels of said chair can be moved into position against said horizontal bar; and
- a pair of clamping members, each of said clamping members being slidably mounted on a corresponding one of said vertically inclined posts, said clamping members each including means for engaging the upper portion of one of said wheels to clamp said wheel between said horizontal bar and a corresponding one of said clamping members.

7. A wheelchair restraint device as defined in claim 6 including mounting means permitting said clamping members to rotate about the axes of said posts whereby said clamping members are rendered capable of securing wheels of chairs having a relatively wide range of wheel sizes and a relatively wide range of wheel spacings.

8. A wheelchair restraint device as defined in claim 6 wherein each of said clamping members includes a projecting member for preventing lateral movement of a chair positioned within said restraint device.

9. A wheelchair restraint device as defined in claim 6 wherein each of said vertically inclined posts is provided with a plurality of spaced grooves, and wherein each of said clamping members includes means for releasably locking a portion of said clamping member into a selected one of said grooves.

10. A wheelchair restraint device for maintaining a wheelchair in a stationary position on a floor, for use with a wheelchair having a pair of wheels mounted on each side of said chair, said device comprising:
- a base adapted to be fastened to said floor;
- a frame having a pair of vertically oriented posts, with one post positioned on either side of a space for a wheelchair, said frame being connected to said base;
- a horizontal bar connected between said posts so that said wheels of said wheelchair can be moved into position against said horizontal bar;
- a pair of clamping members, each of said clamping members being slidably mounted on a corresponding one of said posts, each of said clamping members including a wheel restraining member for resting against one of said wheels to clamp said wheel against said horizontal bar; and
- means for locking each of said clamping members at a selected one of a plurality of locations along said corresponding one of said posts.

11. A wheelchair restraint device as defined in claim 10 including a pair of side restraining members, each of said side restraining members being connected to and projecting laterally from a corresponding one of said wheel restraining members for engagement with the side of the wheel clamped thereby to prevent sidewise movement of said wheel.

12. A wheelchair restraint device as defined in claim 10 wherein said means for locking each of said clamping members upon its supporting post includes ratchet means which allows a wheelchair patient to lock each of said wheel restraining members against a wheel of said wheelchair by a simple downward push against said clamping members.

13. A restraint device for maintaining a wheelchair in a stationary position on a floor, for use with a wheelchair having at least two wheels rotatably mounted to the sides of said chair, said device comprising:
- a base member secured to said floor;
- a horizontal member spaced above the floor and secured to said base member whereby the wheels of said chair can be moved into position against said horizontal member;
- a pair of clamping members;
- means mounting each of said clamping members for travel along a path intersecting a respective one of said wheels;
- means for releasably locking said clamping members to their respective mounting means to selectively lock said clamping members in their said paths in positions to thereby clamp each of said wheels between said horizontal member and a corresponding one of said clamping members; and
- means for biasing said clamping members along their said paths upwardly away from said floor and said wheels so that said clamping members will automatically move away from said wheels when said clamping members are released by said locking means.

14. A restraint device for maintaining a wheelchair in a stationary position on a floor, for use with a wheelchair having at least two wheels rotatably mounted to the sides of said chair, said device comprising:
- a base member secured to said floor;
- a horizontal member spaced above the floor and secured to said base member whereby the wheels of said chair can be moved into position against said horizontal member;
- a pair of clamping members;
- means mounting each of said clamping members for travel along a path intersecting a respective one of said wheels;
- means for releasably locking said clamping members to their respective mounting means to selectively lock said clamping members in their said paths in positions to thereby clamp each of said wheels between said horizontal member and a corresponding one of said clamping members; and
- said locking means includes a pair of spring-loaded blades, and said means mounting said clamping members include a pair of generally upright posts each provided with a plurality of circumferential grooves engageable by one of said blades.

15. A restraint device as defined in claim 14 including spring means for biasing each of said clamping members upwardly on said upright posts, and selectively actuatable means for retracting said blades out of locking engagement with the grooves in said posts to permit said clamping members to be elevated out of engagement with said wheel.

* * * * *